(12) United States Patent
Morshed (10) Patent No.: US 11,010,322 B1
(45) Date of Patent: May 18, 2021

(54) NOC PERIPHERAL INTERCONNECT INTERROGATION SCHEME

(71) Applicant: XILINX, INC., San Jose, CA (US)

(72) Inventor: Abbas Morshed, Los Altos, CA (US)

(73) Assignee: XILINX, INC., San Jose, CA (US)

( * ) Notice: Subject to any disclaimer, the term of this patent is extended or adjusted under 35 U.S.C. 154(b) by 185 days.

(21) Appl. No.: 16/448,727

(22) Filed: Jun. 21, 2019

(51) Int. Cl.
*G06F 13/40* (2006.01)
*G06F 11/07* (2006.01)

(52) U.S. Cl.
CPC ...... *G06F 13/4022* (2013.01); *G06F 11/0745* (2013.01); *G06F 11/0751* (2013.01); *G06F 11/0772* (2013.01)

(58) Field of Classification Search
CPC ............... G06F 13/4022; G06F 13/4027
See application file for complete search history.

(56) References Cited

U.S. PATENT DOCUMENTS

| | | | |
|---|---|---|---|
| 9,632,869 B1* | 4/2017 | Lu .................... | G11C 29/52 |
| 9,753,880 B1* | 9/2017 | Sodke ................ | G06F 13/4022 |
| 10,423,558 B1* | 9/2019 | Fukami .............. | G06F 3/067 |
| 10,503,643 B1* | 12/2019 | Rychlik .............. | G06F 12/0815 |
| 2008/0247320 A1* | 10/2008 | Grah .................. | H04L 41/5012 370/241 |

* cited by examiner

*Primary Examiner* — Matthew M Kim
*Assistant Examiner* — Kurosu Risa Altaf
(74) *Attorney, Agent, or Firm* — Patterson + Sheridan, LLP (57) ABSTRACT

A network on a chip (NOC) peripheral interface (NPI) includes an NPI root, a plurality of switches coupled to the NPI root, and a plurality of NPI protocol blocks coupled to the plurality of switches. The NPI root, the plurality of switches, and the plurality of NPI protocol blocks are configured to route signals received from a master to a plurality of circuit blocks. A non-service command is routed to an intended circuit block of the plurality of circuit blocks. A switch of the plurality of switches or an NPI protocol block of the plurality of NPI protocol blocks generate a response message for a service command query with the destination address associated with the intended circuit block that is received from the master instead of routing the service command query to the intended circuit block.

20 Claims, 8 Drawing Sheets

| 33 | 32 | 31 | 30:27 | 26:25 | 24:16 | 15:2 | 1:0 |
|---|---|---|---|---|---|---|---|
| L=1 | Resp | R/W | BLEN | RSVD | Resp Agent Lower ID | Address | 2'b01 |

| 33 | 32 | 31:27 | 26:25 | 24:16 | 15:2 | 1:0 |
|---|---|---|---|---|---|---|
| L=1 | Resp | DON'T CARE | RSVD | Resp Agent Lower ID | DON'T CARE | 2'b10 |

NOC PERIPHERAL INTERCONNECT INTERROGATION SCHEME

TECHNICAL FIELD

The disclosure generally relates to a network on a chip (NOC) and, in particular, to interrogating a NOC peripheral interconnect.

BACKGROUND

Electronic devices can contain a packet network structure known as a network on a chip (NOC). Some of these electronic devices may include programmable integrated circuits such as a field programmable gate array (FPGA), programmable logic device (PLD), etc. A NOC may be programmed that routes packets between various components, e.g., configurable logic. Testing for NOC and its operation is difficult. Testing in such an environment may include transmitting a sideband signal to the root node (i.e. circuit block), resulting in routing congestion and complexity. Moreover, the switches and/or the protocol nodes do not appear in the programming space making the information within each inaccessible by a master.

SUMMARY

Accordingly, a need has arisen to interrogate the NOC peripheral interface (NPI) without having to route signals (i.e. query signals) to the root node (i.e. circuit block). Moreover, a need has arisen to interrogate the NPI instead of interrogating the circuit block in order to reduce routing congestion and complexity.

In some nonlimiting embodiments, the NPI is used to interrogate switches and/or protocol nodes, within the NPI network, for their address setting and/or any detected errors, instead of adding sideband signals. In some embodiments, the NPI intervenes when a service command query is received and responds to the query instead of routing the query to the circuit block for a response. The NPI interrogation can occur during run time and/or wafer testing, ensuring that all routes within the NPI switches and/or NPI protocol blocks have the correct address setting. In some nonlimiting examples, the circuit blocks need not be powered up for the interrogation to occur and return a response.

A network on a chip (NOC) peripheral interface (NPI) includes an NPI root, a plurality of switches coupled to the NPI root, and a plurality of NPI protocol blocks coupled to the plurality of switches. The NPI root, the plurality of switches, and the plurality of NPI protocol blocks are configured to route signals received from a master to a plurality of circuit blocks. A non-service command is routed to an intended circuit block of the plurality of circuit blocks. A switch of the plurality of switches or an NPI protocol block of the plurality of NPI protocol blocks generate a response message for a service command query with the destination address associated with the intended circuit block that is received from the master instead of routing the service command query to the intended circuit block.

In some embodiments, the service command query is a status/error check associated with the intended circuit block or an address check associated with the intended circuit block. It is appreciated that in some embodiments the intended circuit block is powered off. According to one nonlimiting example, aperture values for the plurality of circuit blocks is calculated and an address to each circuit block of the plurality of circuit blocks is assigned. The response message may indicate an error responsive to a mismatch between the destination address in the service command query and the assigned address.

In some nonlimiting examples, the non-service command or the service command query is received by NPI root via advance extensible interface (AXI). The non-service command or the service command query is address mapped and packetized by the NPI root. The addressed mapped and packetized command is transverse through a subset of the plurality of switches to reach an NPI protocol of the plurality of NPI protocols. The NPI protocol changes a format of the received addressed mapped and packetized non-service command before forwarding the request to the intended circuit block. It is appreciated that a switch of the plurality of switches or an NPI protocol of the plurality of NPI protocols generates a packetized response message responsive to the service command query. The packetized response message is routed, from the switch of the NPI protocol generating the packetized response, to the NPI root where it is converted to an AXI response before it is transmitted to the master.

According to some nonlimiting examples, a switch of the plurality of switches generates the response message indicating an error responsive to determining that the destination address is an invalid address. In one embodiment, a switch of the plurality of switches generates the response message indicating an error responsive determining that a node connected to a switch of the plurality of switches is not operational.

In some nonlimiting examples, an NPI protocol of the plurality of NPI protocols generates the response message indicating an error responsive to determining that the intended circuit block is not operational. It is appreciated that in some embodiments, an NPI protocol of the plurality of NPI protocols generates the response message indicating an error if the intended circuit block has responded with an error.

In some nonlimiting examples, in response to receiving the service command query all non-service commands are completed. The NPI root enables NPI service command mode and conducts the service command query. Upon completing the service command query, the NPI service command mode is disabled to return to NPI function mode for processing non-service commands.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Examples described herein relate to an interrogation scheme of switches and protocol nodes of a network on a chip (NOC) peripheral interface (NPI) for detecting issues with address setting and for detecting errors without a need to route signals (i.e. query signals) to the root node (i.e. circuit block). In general, NOC is used to route signals to one or more circuit blocks. NPI may be used to program interconnect of the NOC and/or circuit blocks.

In some nonlimiting embodiments, NPI intervenes when a service command query is received. The NPI responds to the query instead of routing the query to the circuit block for a response, thereby alleviating the routing congestion and complexity. For example, switches within the NPI and/or NOC or protocol nodes within the NPI may respond directly without routing the query to the circuit block. The interrogation scheme may occur during run time and/or wafer testing, ensuring that all routes within the NPI switches and/or NPI protocol blocks have the correct address setting. In some nonlimiting examples, the circuit blocks need not be powered up for the interrogation to occur and return a response.

It is appreciated that the embodiments are described with respect to a NOC and NPI in a field programmable gate array (FPGA) for illustrative purposes. Thus, the embodiments should not be construed as limited to FPGA but to the contrary to any electronic device that utilizes a NOC and/or NPI. Furthermore, it is appreciated that the embodiments for interrogation are described with respect to an NPI for illustrative purposes but the embodiments should not be construed as limited thereto. For example, similar interrogation techniques may be applied to a NOC.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

Figure 1:
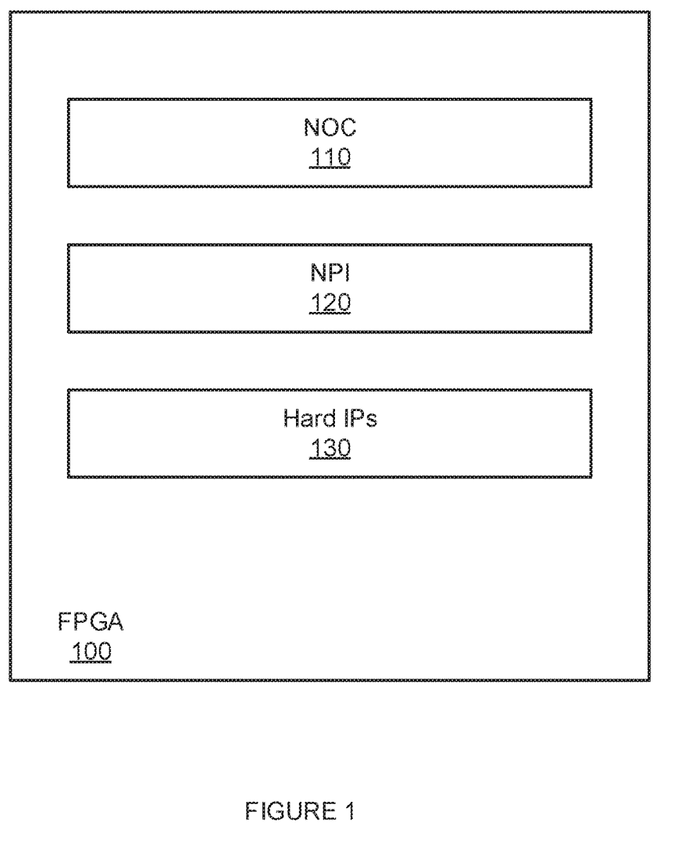
FIG. 1 shows a block diagram depicting a field programmable gate array (FPGA) including a NOC peripheral interface interrogation scheme, according to some examples.

Referring now to FIG. 1, a block diagram depicting an FPGA 100 including a NOC peripheral interface interrogation scheme, according to some examples is shown. The FPGA 100 includes a NOC 110, an NPI 120, and a plurality of hard IPs (also referred to as circuit blocks) 130. The NOC 110 is a communication subsystem that provides communication between various nodes (e.g., hardware elements such as processors, memory, digital-to-analog converters, I/O ports, etc.) in the FPGA 100. In some embodiments, the NPI 120 is a switching network which may be used to program the NOC 110, which may also include one or more switches. In other words, the NPI 120 may alter the manner in which the NOC 110 provides communication between nodes, e.g., hard IPs 130 also referred to as circuit blocks, in the FPGA 100. NPI 120 may include a tree structure including an NPI root, a plurality of switches, and a plurality of protocol node blocks (shown in FIG. 2). It is appreciated that the switches may include multiple ports and may be coupled to memory storing configuration information for configuring the NOC 110 and other elements of the FPGA 100, e.g., hard IPs (circuit blocks). In other words, the data stored in the configuration memories by the NPI 120 determines the configuration of the switches of the NOC 110 and other elements connected to the NOC 110.

It is appreciated that the same NOC 110 and/or NPI 120 may be used to not only to facilitate communication between various nodes and to program accordingly, but also to interrogate switches and protocol nodes of the NPI 120 for detecting issues with address setting and for detecting errors without a need to route signals (i.e. query signals) to the root node (i.e. circuit block). In other words, the NPI 120 intervene when a service command query is received. The NPI 120 responds to the query instead of routing the query to the circuit block (e.g., hard IPs also referred to as circuit blocks) for a response. Therefore, routing congestion and complexity is reduced. The interrogation scheme may occur during run time and/or wafer testing, ensuring that all routes within the NPI switches and/or NPI protocol blocks have the correct address setting. In some nonlimiting examples, the circuit blocks need not be powered up for the interrogation to occur and return a response.

It is appreciated that the embodiments are described with respect to a NOC and NPI in a field programmable gate array (FPGA) for illustrative purposes. Thus, the embodiments should not be construed as limited to FPGA but to the contrary to any electronic device that utilizes a NOC and/or NPI. For example, the embodiments are equally applicable to non-programmable IC such as an ASIC. In other words, a NOC on a non-programmable IC may be programmable as described below or could be non-programmable such that the network configuration of the NOC cannot be changed (e.g., the switches in the NOC remain coupled to the same switches and nodes as when the IC was fabricated). Furthermore, even though the NOC 110 and the NPI 120 are shown as being separate from one another, the NPI 120 can be considered as part of the NOC 110 in some embodiments.

Figure 2:
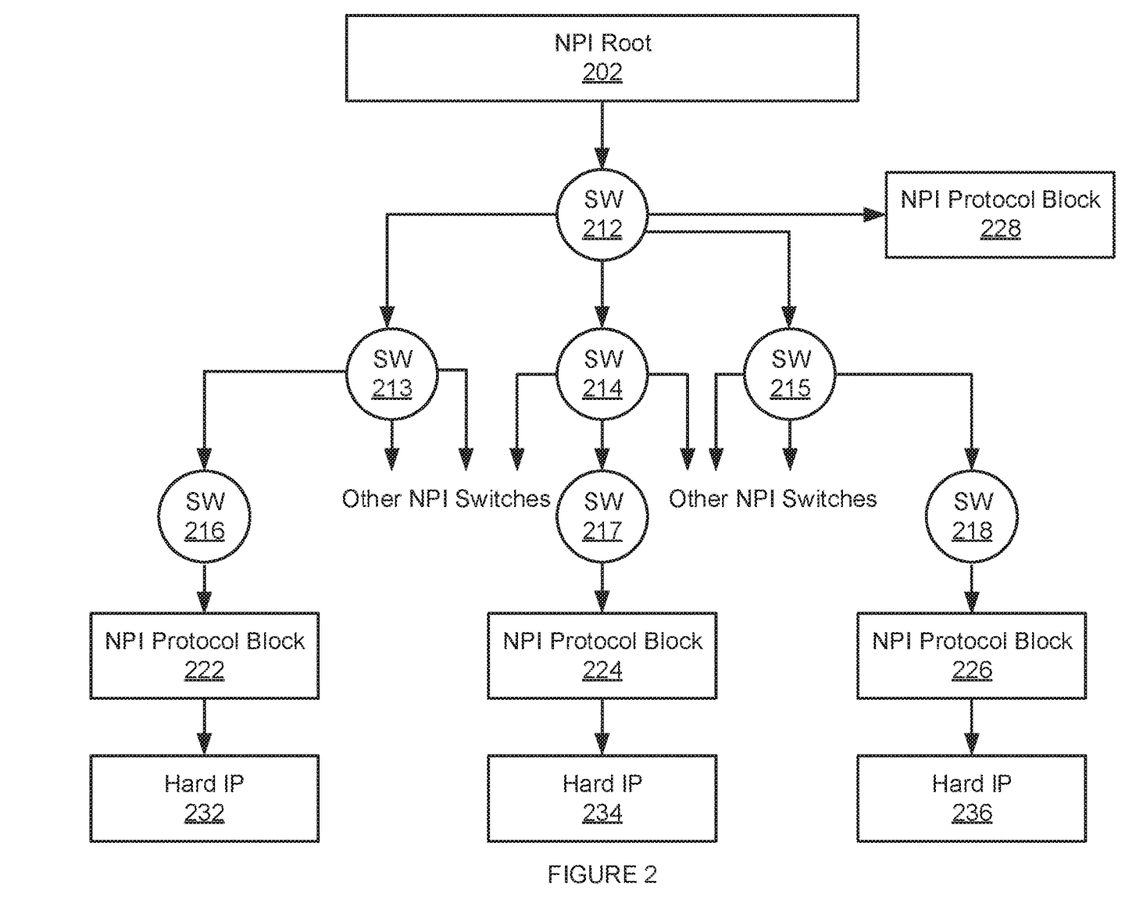
FIG. 2 shows a block diagram depicting an interrogation scheme enabled NOC peripheral interface, according to some examples.

Referring now to FIG. 2, a block diagram depicting an interrogation scheme enabled NPI, according to some examples is shown. As discussed above, the NPI and/or NOC facilitate communication between various nodes and may be programmed or configured accordingly. The existing NPI can also be used to interrogate switches and protocol nodes for detecting issues with address setting and for detecting errors. The NPI, as illustrated, has a tree like structure.

In some embodiments, the NPI includes an NPI root 202, a plurality of switches 212-218, and a plurality of NPI protocol block nodes 222-228. The NPI root 202 is coupled to the plurality of switches 212-218. It is appreciated that the switches may further be coupled to other switches. For example, switch 213 may be coupled to a parent switch 212 and a child switch 216 as well as other children switches. Similarly, switch 214 may be coupled to the parent switch 212 while it is further coupled to the child switch 217 and other children switches. In contrast, switch 215 may be coupled to the parent switch 212 while it is also coupled to the child switch 218 as well as other children switches.

It is appreciated that the last switch in any given branch may be coupled to a respective NPI protocol block node. For example, switch 212 may be coupled to the NPI protocol block node 228, the switch 216 may be coupled to the NPI protocol block node 222, the switch 217 may be coupled to the NPI protocol block node 224, and the switch 218 may be coupled to the NPI protocol block node 226. A subset of the NPI protocol block nodes may be coupled to circuit blocks (i.e. hard IPs). For example, the NPI protocol block node 222 may be coupled to the hard IP 232, the NPI protocol block node 224 may be coupled to the hard IP 234, and the NPI protocol block node 226 may be coupled to the hard IP 236.

In some embodiments, the hard IPs 232-236 may be any circuit blocks. For example, in some examples the hard IP may be, for non-limiting examples, a math engine, a memory controller, a transceiver, a mixed-mode clock manager, a global clock manager, a system monitor (SYSMON), or an eXtended Performance I/O (XPIO) transceiver for interfacing with other components such as a DDR4 memory, etc.

It is appreciated that in some embodiments, the switches 212-218 and/or NPI protocol block nodes 222-228 may be used by the NPI 120 to perform auto address generation. In other words, once the chip is powered up, the addresses for the hard IPs, e.g., hard IPs 232-236 may be generated and latched within the NPI 120. It is appreciated that in some embodiments, the switches 212-218 and/or the NPI protocol block nodes 222-228 may calculate the aperture values for the hard IPs. It is appreciated that the aperture values increase as the switches get closer to the NPI root and the aperture values decrease as they get closer to the hard IP.

According to some embodiments, the NPI and/or NOC route non-service commands to the intended hard IPs or target. For example, the NPI root 202 may receive a non-service command such as a read request or a write request, from a master. The NPI root 202 may route the received non-service command to the appropriate switch(es), e.g., switches 212 to 215 to 218, and the appropriate NPI protocol block node, e.g., NPI protocol block node 226, and ultimately to the intended destination/target, e.g., hard IP 236. In other words, the non-service command transverses through the NOC 110 and NPI 120 based on the configuration of the switches and the NPI protocol block nodes (as programmed before) in order to be successfully routed to the intended destination, e.g., hard IP. The non-service commands may have a format and structure as described in FIG. 4A.

In some embodiments, the non-service command may be transmitted from the master to the NPI root 202 in advanced extensible interface (AXI) format. The received non-service command may be address mapped, AXI converted, chopped and packetized and transmitted to the switches to be switched to the targeted slave. As discussed above, the non-service command may transverse through one or more switches before reaching an NPI protocol block node where it is converted based on the configuration protocol of the NPI protocol block node before it is transmitted to the intended target, hence hard IP in this example.

Upon receiving the non-service command, the intended destination/target, e.g., hard IP 236 responds. The response message may similarly transverse through the NOC 110 and NPI 120 to be sent to the master. For example, the response message may be transmitted from the hard IP 236 to the NPI protocol block node 226 to the switch 218 which routes it to the switch 215 where it is routed to switch 212 and ultimately to the NPI root 202 that routes it to the master. The response message to the non-service command may have a format and structure as described in FIG. 4B.

In some embodiments, the target/destination, e.g., hard IP 236 may transmit the response message to the NPI protocol block node 226. The NPI protocol block node 226 may convert the received response message into chopped and packetized format and it may transverse through the switches, e.g., switches 218 to 215 to 212, based on the configuration of the NOC 110 and NPI 120 (which may have been programmed before). The switch 212 transmits the chopped and packetized format response message to the NPI root 202 where it is converted into the AXI format and transmitted to the master.

It is appreciated that in some embodiments, the master may issue a service command query instead of a non-service command. The service command query may be received by the NPI root 202 similar to non-service command. The service command query indicates that the sender's intension to interrogate for address setting and for detecting any potential errors. The service command query may have a particular format and structure, as described in great detail in FIG. 4C. The service command query may be converted by the NPI root 202, the switches 212-218, and the NPI protocol block nodes 222-228, similar to the non-service commands, as described above. However, the service command query is responded to by a component within the NPI 120. For example, one or more switches and/or one or more NPI protocol block nodes may respond to the service command query instead of routing it to the intended target/destination, e.g., hard IP 234 as an example. In other words, the NPI 120 intervene and generate a response message to the service command query. The response message provides information regarding the address setting and/or any potential errors (described in more detail with respect to FIGS. 4D-4F). The response message to the service command query transverses through the NPI 120 similar to the response message to the non-service command, as described above, and is ultimately transmitted from the root node 202 to the master.

Figure 3:
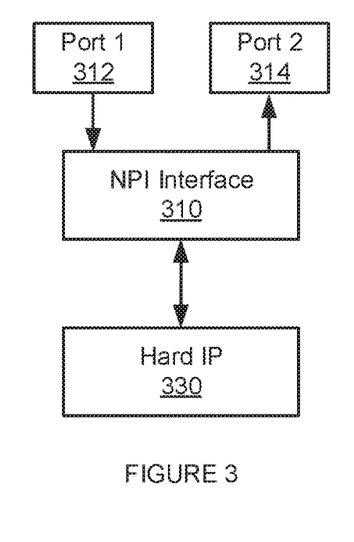
FIG. 3 shows a block diagram of another interrogation scheme enabled NOC peripheral interface, according to some examples.

Referring now to FIG. 3, a block diagram of another interrogation scheme enabled NOC peripheral interface, according to some examples is shown. FIG. 3 is substantially similar to that of FIGS. 1-2 discussed above. The NPI interface 310 is similar to the NPI 120 and has a tree structure, as discussed in FIG. 2. The hard IP 330 is similar to the hard IP and/or circuit blocks as described in FIGS. 1-2. The NPI interface may include ports 312 and 314 for receiving and transmitting of messages. For example, the port 312 may be used for receiving non-service commands and/or service command queries from a master whereas port 314 may be used to transmit the response message to the non-service command and/or service command queries to the master. It is appreciated that components within the NPI 120 and/or NOC 110 may also have their respective ports.

For example, the NPI root, the switches, the NPI protocol block nodes, etc., may each have their respective port(s).

Figure 4A:
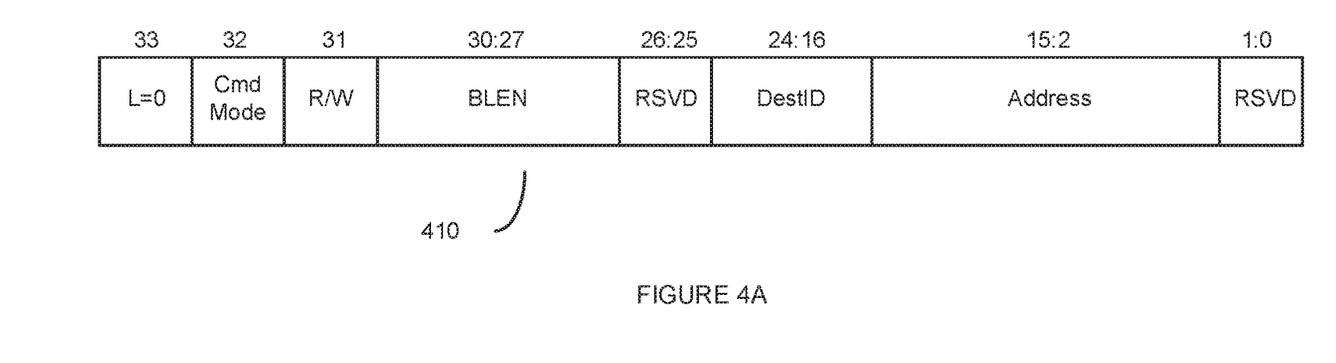
FIGS. 4A-4F show service command query and non-service command, according to some examples.

Referring now to FIGS. 4A-4F, service command query and non-service command, according to some examples are shown. Referring specifically to FIG. 4A, the format of the non-service command 410 is shown. In this example, the non-service command is a read request. Bit order 33 is L=0 indicating last flit in a request consisting of multiple flits, bit 32 is the command mode which is non-service command, bit 31 indicates whether the non-service command is a read or a write, bits 30:27 identify the burst length, bits 26:25 are reserved, bits 24:16 are the destination ID (e.g., destination ID of the circuit block, hard IP, etc.), bits 15:2 are the address of the target/destination, and bits 1:0 are reserved. It is appreciated that a write request has a bit order 33 with L=1 or 0 but it may also include data packets. It is appreciated that a read request has a bit order 33 with L=1.

Figure 4B:
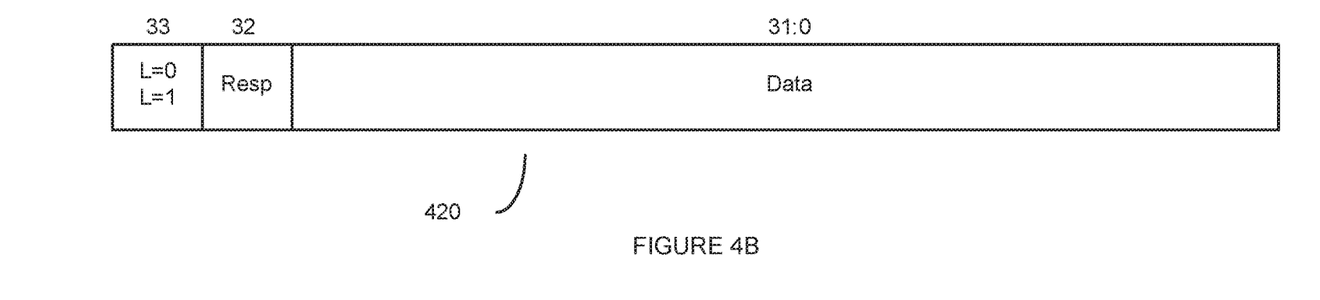

Referring now to FIG. 4B, the response message format 420 for the non-service command, e.g., read command, is shown. Bit order 33 may be L=0 or 1, bit 32 indicates that this is a response message, followed by bits 31:0 for the data in response to the read request. It is appreciated that for a write command, the response message may include reserved bits for bits 31:0 instead.

Figure 4C:
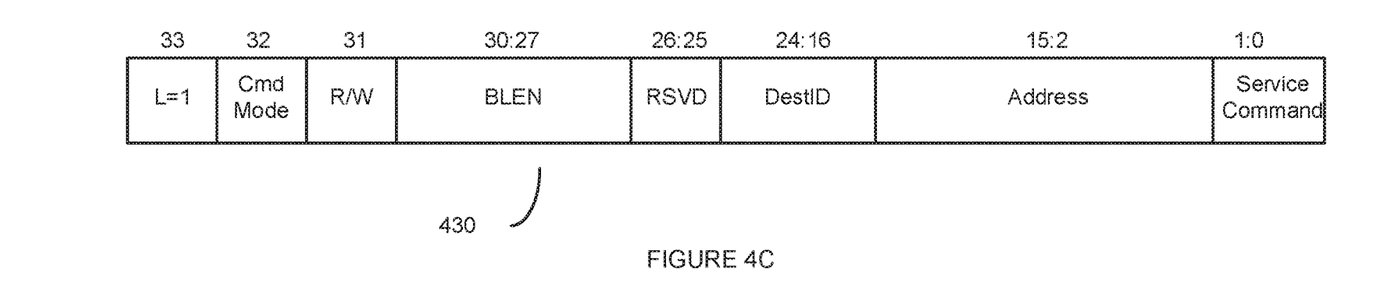

Referring now to FIG. 4C, a service command query format 430 in accordance with one embodiment is shown. The format of the service command query is similar to the read request above, as described with respect to FIG. 4A. Bit 32 of the service command query, however, includes a command mode indicating that this is a service command query. Furthermore, bits 1:0 of the service command query determine the type of query associated with the service command query. For example, a 00 type may be associated with status/error check. The status/error check query returns the error type, determines whether the interface is ready, returns the response agent's upper/lower NPI-ID, response agent's type (e.g., switch versus NPI protocol block node), etc. A 01 type may be associated with command control/address check. The command control/address check query returns the original request command except that the destination ID is replaced with lower NPI-ID of the response from the NPI protocol block node. A 10 type may be associated with asserting a preset_n for certain number of cycles, e.g., 16. The 10 type may assert preset_n for 16 cycles and respond in a similar fashion as type 01 except for bits 2:15 and 27:31 are replaced with DON'T CARE bits, which indicate that they can be either a 0 or a 1. In this illustrative example, type 11 is reserved and not in use. However, it is appreciated that type 11 may be used for other status checks/errors. Moreover, it is appreciated that more than 2 bits may be used for the type in the future in order to expand the number of status checks/errors that can be performed. As such, using 2 bits to identify the service command type is for illustrative purposes and should not be construed as limiting the embodiments.

Figure 4D:
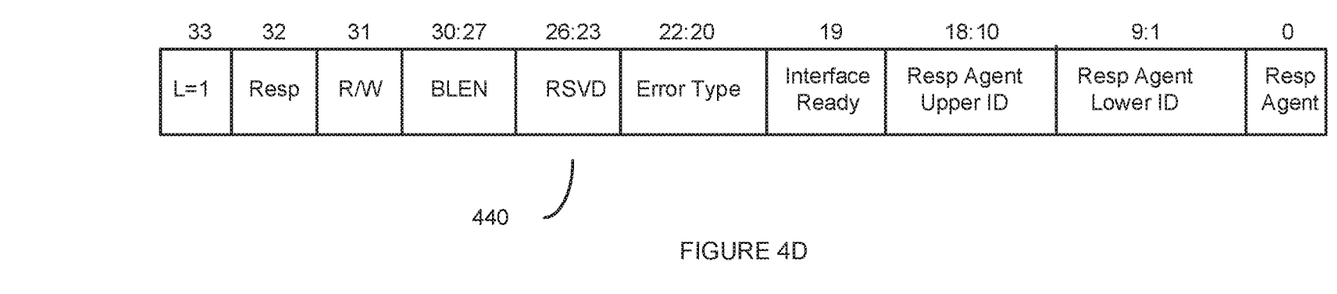

Referring now to FIG. 4D, a response message format 440 to the service command query, e.g., command type 00, in accordance with one embodiment is shown. Bit 32 identifies the message as a response. Bits 22:20 identify the error type, bit 19 identifies whether the interface is ready, bits 18:10 return the agent's upper ID and bits 9:1 return the agent's lower ID, and bit 0 identifies the response agent.

Figure 4E:
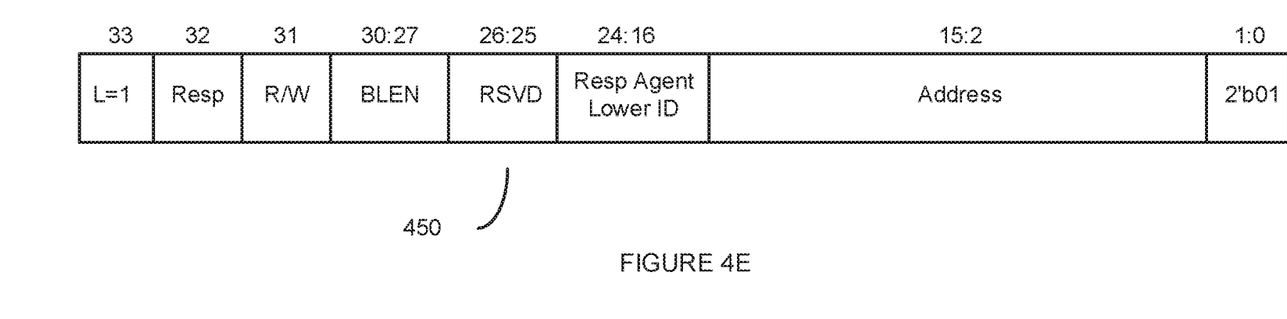

Referring now to FIG. 4E, a response message format 450 to the service command query, command type 01, in accordance with one embodiment is shown. The response message 450 is similar to 440 except that bits 24:16 returns the agent's lower ID, and bits 15:2 return the address, and bits 1:0 determine the service command query type 01.

Figure 4F:
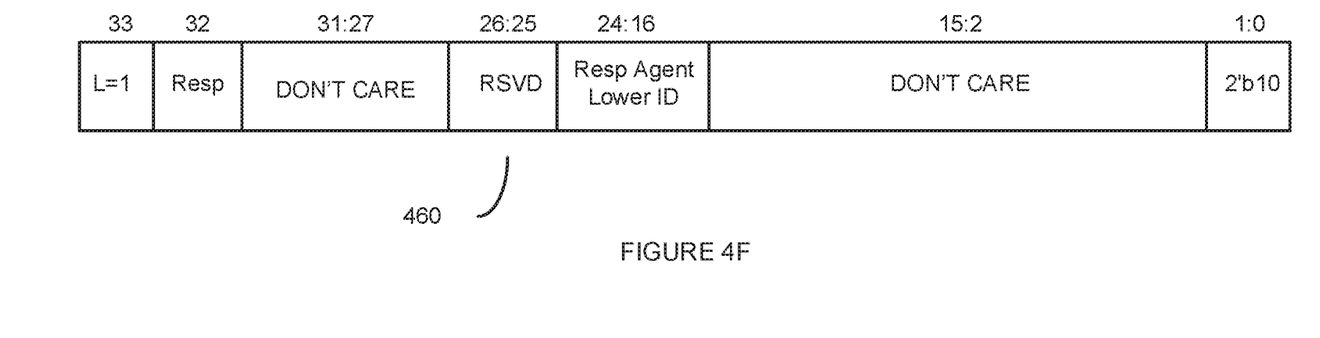

Referring now to FIG. 4F, a response message format 460 to the service command query, e.g., command type 10, in accordance with some embodiments is shown. The response message is similar to those described in FIGS. 4D-4E except that bits 31:27 and 15:2 are DON'T CARE and that bits 1:0 determines the service command query type 10.

Accordingly, the switches within the NPI 120 may respond to the service command query. The response from the switches may be invalid destination addresses if there is a mismatch between the address in the service command query and the determined address by the switch and the calculated aperture value. Moreover, the switches may determine whether the target/destination such as the hard IP connected to that branch is not operational.

The NPI protocol block nodes may determine whether the target/destination, e.g., hard IP, is operational or not. Furthermore, in certain examples, the target/destination, e.g., hard IP, may respond to a non-service command with an error and once the NPI protocol block node receives a service command query, it may indicate in its response that the destination/target had responded with an error.

It is appreciated that according to some embodiments, when a service command query is received, it is first ensured that all non-service commands are completed. The NPI root may be then programmed to enable the NPI service mode. The service command is then sent from the master to the NPI 120 and the response message is generated by the NPI 120 and returned to the master. Once the response message is returned and if there are no more service command queries, the NPI root is programmed to disable the NPI service mode in order to resume servicing non-service commands.

Figure 5:
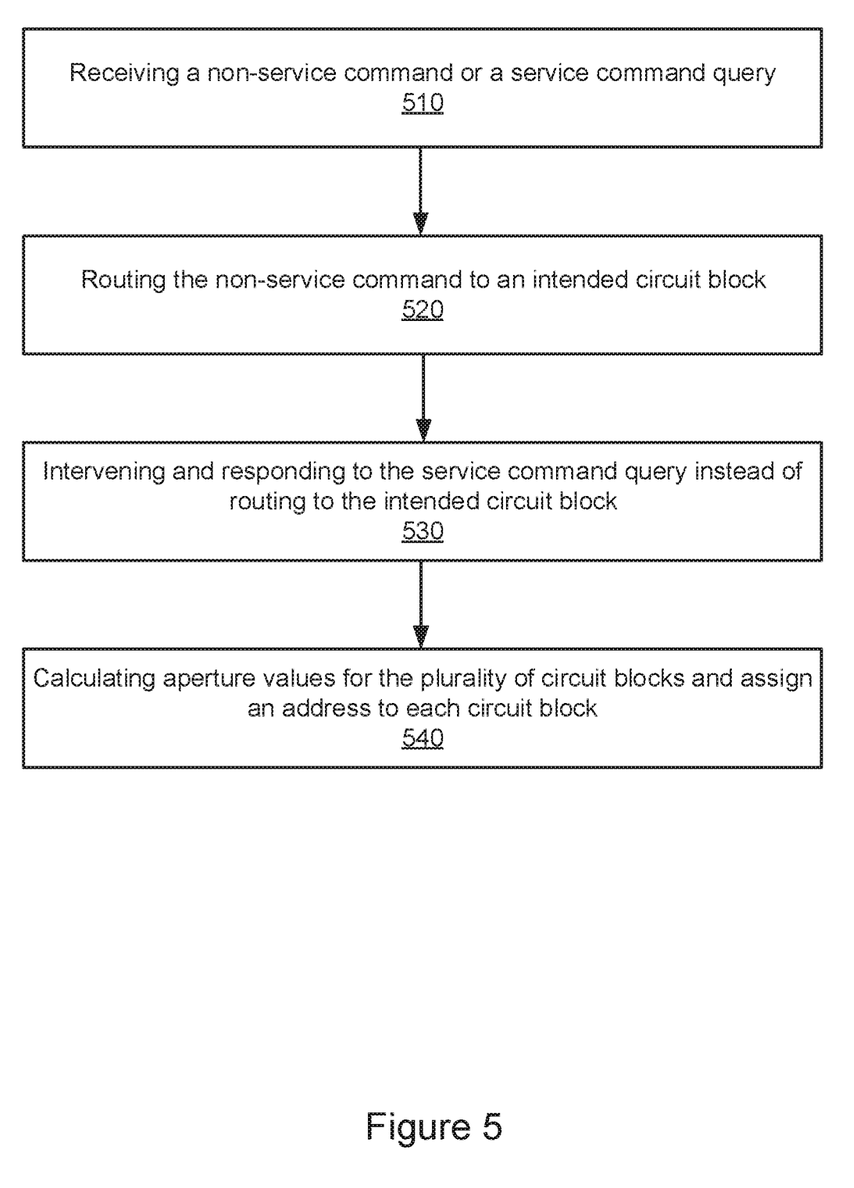
FIG. 5 shows a flow diagram for interrogation scheme enabled NOC peripheral interface, according to some examples.

Referring now to FIG. 5, a flow diagram for interrogation scheme enabled NOC peripheral interface, according to some examples is shown. The flow chart, as described below, may be implemented by an NPI and the interrogation scheme that has been described above.

At step 510, a non-service command or a service command query is received. The non-service command or the service command query may be similar to those described above. The service command query is routed via the NOC and NPI, as described above. At step 520, the non-service command is routed to an intended circuit block of a plurality of circuit blocks, as described above. At step 530, the NPI as described above intervenes when a service command query is received instead of routing it to the intended circuit block. As described above, the NPI may include an NPI root, a plurality of switches, and a plurality of NPI protocol blocks. A switch from the plurality of switches or an NPI protocol block of the plurality of NPI protocol blocks may intervene with the service command query and generate the NPI response to the service command query.

In some examples, at step 540, aperture values for the plurality of circuit blocks is calculated and an address is assigned to each circuit block. It is appreciated that the NPI response may be similar to that described above and may identify an error. For example, the NPI response indicates an error if there is a mismatch between the destination address in the service command query and the assigned address. As described above, the NPI response indicates an error if the NPI determines that the destination address is an invalid address. According to some examples, the NPI response indicates an error if a node connected to a switch of the NPI is not operational. In one example, the NPI response indicates an error if the NPI determines that the intended circuit block is not operational. In some examples, the NPI response indicates an error if the intended circuit block has responded with an error.

In some embodiments, the service command query is a status/error check associated with the intended circuit block or it may be an address check associated with the intended circuit block. According to some examples, the circuit block is powered off.

Figure 6:
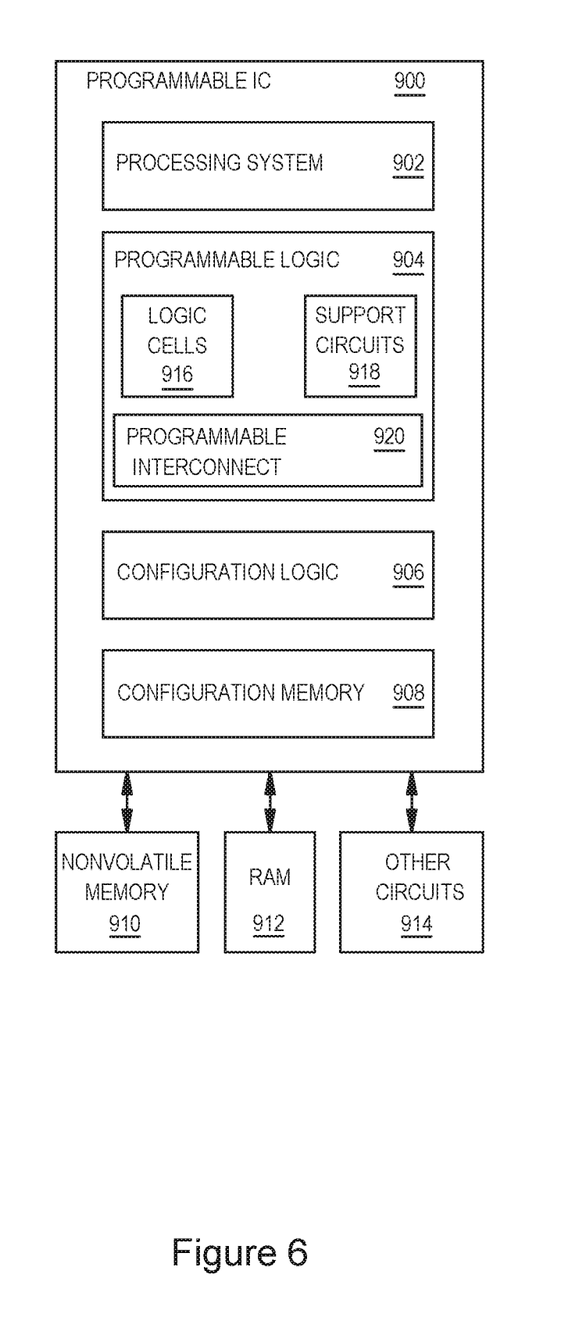
FIG. 6 is a block diagram depicting a programmable integrated circuit (IC), according to some examples.

FIG. 6 is a block diagram depicting a programmable integrated circuit (IC) 900 according to an example. The programmable IC 900 can implement the integrated circuit (IC) chip of systems of FIGS. 1, 2, 3, 4A-4F, and 5 in whole or in part. The programmable IC 900 includes a processing system 902, programmable logic 904, configuration logic 906, and configuration memory 908. The programmable IC 900 can be coupled to external circuits, such as nonvolatile memory 910, RAM 912, and other circuits 914.

The processing system 902 can include microprocessor(s), memory, support circuits, IO circuits, and the like. The programmable logic 904 includes logic cells 916, support circuits 918, and programmable interconnect 920. The logic cells 916 include circuits that can be configured to implement general logic functions of a plurality of inputs. The support circuits 918 include dedicated circuits, such as transceivers, input/output blocks, digital signal processors, memories, and the like. The logic cells and the support circuits 918 can be interconnected using the programmable interconnect 920. Information for programming the logic cells 916, for setting parameters of the support circuits 918, and for programming the programmable interconnect 920 is stored in the configuration memory 908 by the configuration logic 906. The configuration logic 906 can obtain the configuration data from the nonvolatile memory 910 or any other source (e.g., the RAM 912 or from the other circuits 914).

Figure 7:
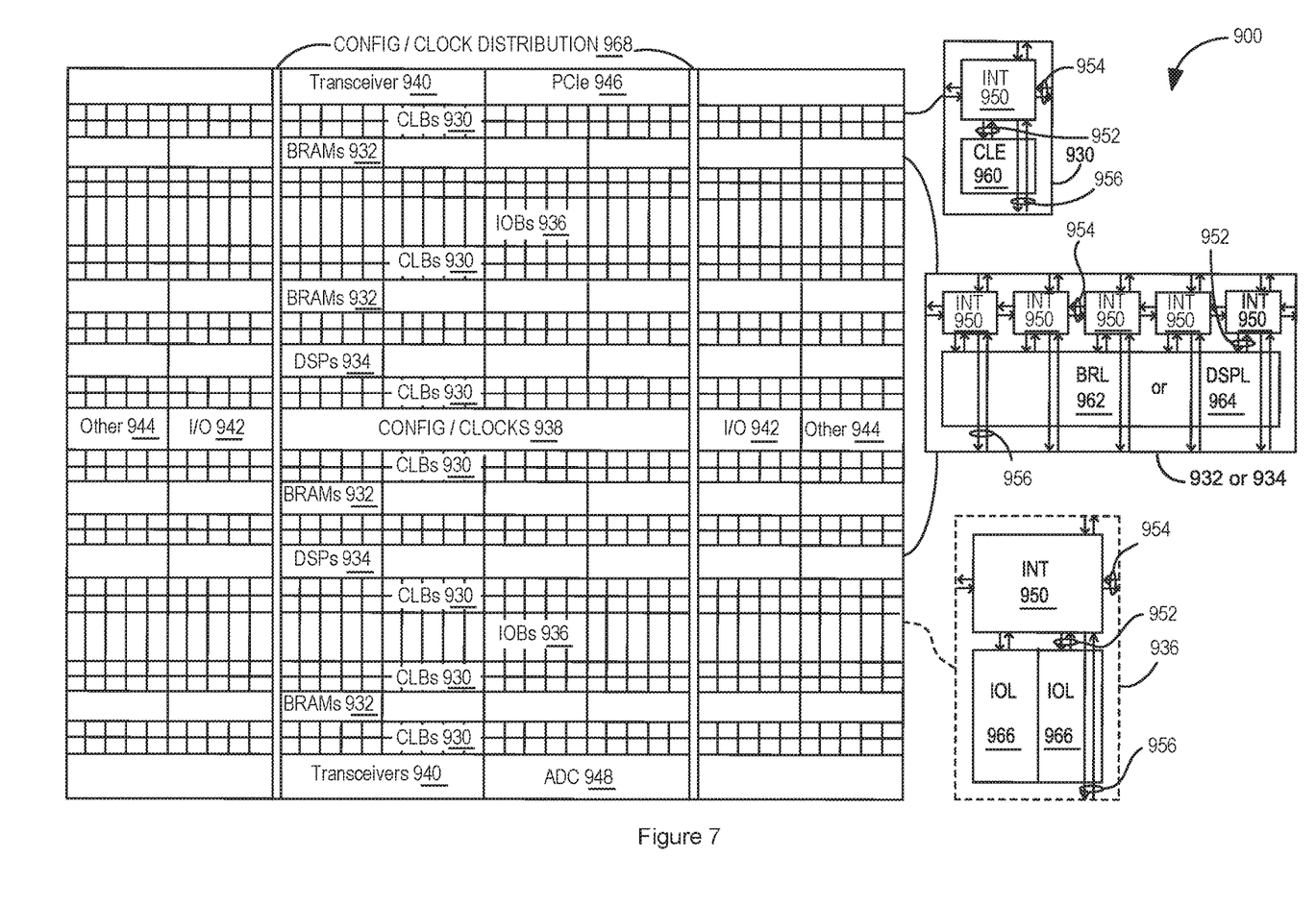
FIG. 7 is a field programmable gate array (FPGA) implementation of the programmable IC, according to some examples.

FIG. 7 illustrates an FPGA implementation of the programmable IC 900 that includes a large number of different programmable tiles including configurable logic blocks ("CLBs") 930, random access memory blocks ("BRAMs") 932, signal processing blocks ("DSPs") 934, input/output blocks ("IOBs") 936, configuration and clocking logic ("CONFIG/CLOCKS") 938, digital transceivers 940, specialized input/output blocks ("I/O") 942 (e.g., configuration ports and clock ports), and other programmable logic 944 such as digital clock managers, system monitoring logic, and so forth. The FPGA can also include PCIe interfaces 946, analog-to-digital converters (ADC) 948, and the like.

In some FPGAs, each programmable tile can include at least one programmable interconnect element ("INT") 950 having connections to input and output terminals 952 of a programmable logic element within the same tile, as shown by examples included in FIG. 9. Each programmable interconnect element 950 can also include connections to interconnect segments 954 of adjacent programmable interconnect element(s) in the same tile or other tile(s). Each programmable interconnect element 950 can also include connections to interconnect segments 956 of general routing resources between logic blocks (not shown). The general routing resources can include routing channels between logic blocks (not shown) comprising tracks of interconnect segments (e.g., interconnect segments 956) and switch blocks (not shown) for connecting interconnect segments. The interconnect segments of the general routing resources (e.g., interconnect segments 956) can span one or more logic blocks. The programmable interconnect elements 950 taken together with the general routing resources implement a programmable interconnect structure ("programmable interconnect") for the illustrated FPGA.

In an example implementation, a CLB 930 can include a configurable logic element ("CLE") 960 that can be programmed to implement user logic plus a single programmable interconnect element ("INT") 950. A BRAM 932 can include a BRAM logic element ("BRL") 962 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 934 can include a DSP logic element ("DSPL") 964 in addition to an appropriate number of programmable interconnect elements. An 10B 936 can include, for example, two instances of an input/output logic element ("IOL") 966 in addition to one instance of the programmable interconnect element 950. As will be clear to those of skill in the art, the actual I/O pads connected, for example, to the input/output logic element 966 typically are not confined to the area of the input/output logic element 966.

In the pictured example, a horizontal area near the center of the die is used for configuration, clock, and other control logic. Vertical columns 968 extending from this horizontal area or column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A network on a chip (NOC) peripheral interface (NPI) comprising:
   an NPI root;
   a plurality of switches coupled to the NPI root; and
   a plurality of NPI protocol blocks coupled to the plurality of switches,
   wherein the NPI root, the plurality of switches, and the plurality of NPI protocol blocks are configured to route signals received from a master to a plurality of circuit blocks,
   and wherein a non-service command is routed to an intended circuit block of the plurality of circuit blocks,
   and wherein a switch of the plurality of switches or an NPI protocol block of the plurality of NPI protocol blocks generates a response message for a service command query with a destination address associated with the intended circuit block that is received from the master instead of routing the service command query to the intended circuit block.

2. The NPI of claim 1, wherein the service command query is a status/error check associated with the intended circuit block or an address check associated with the intended circuit block.

3. The NPI of claim 1, wherein the intended circuit block is powered off.

4. The NPI of claim 1, wherein aperture values for the plurality of circuit blocks are calculated and wherein an address to each circuit block of the plurality of circuit blocks is assigned.

5. The NPI of claim 4, wherein the response message indicates an error responsive to a mismatch between the destination address in the service command query and the assigned address.

6. The NPI of claim 1, wherein the non-service command or the service command query is received by the NPI root via advance extensible interface (AXI), wherein the non-service command or the service command query is address mapped and packetized by the NPI root, wherein the addressed mapped and packetized command is transversed through a subset of the plurality of switches to reach an NPI protocol of the plurality of NPI protocols, wherein the NPI protocol changes a format of the received addressed mapped and packetized non-service command before forwarding the request to the intended circuit block.

7. The NPI of claim 6, wherein a switch of the plurality of switches or an NPI protocol of the plurality of NPI protocol blocks generates a packetized response message responsive to the service command query, and wherein the packetized response message is routed, from the switch of the NPI protocol generating the packetized response to the NPI root where it is converted to an AXI response before it is transmitted to the master.

8. The NPI of claim 1, wherein a switch of the plurality of switches generates the response message indicating an error responsive to determining that the destination address is an invalid address.

9. The NPI of claim 1, wherein a switch of the plurality of switches generates the response message indicating an error responsive to determining that a node connected to a switch of the plurality of switches is not operational.

10. The NPI of claim 1, wherein an NPI protocol of the plurality of NPI protocol blocks generates the response message indicating an error responsive to determining that the intended circuit block is not operational.

11. The NPI of claim 1, wherein an NPI protocol of the plurality of NPI protocol blocks generates the response message indicating an error if the intended circuit block has responded with an error.

12. The NPI of claim 1, wherein in response to receiving the service command query completing all non-service commands, the NPI root enabling NPI service command mode, conducting the service command query and upon completing the service command query disabling the NPI service command mode to return to NPI function mode for processing non-service commands.

13. A method comprising:
receiving a non-service command or a service command query via a network on a chip (NOC) and a NOC peripheral interface (NPI) for routing to an intended circuit block of a plurality of circuit blocks, wherein the NOC is configured to route signals to the plurality of circuit blocks, and wherein the NPI is configured to program interconnect of the NOC and wherein the NPI is further configured to program interconnect of the plurality of circuit blocks;
routing the non-service command to an intended circuit block of the plurality of circuit blocks, wherein the non-service command has a destination address associated with the intended circuit block to process the non-service command;
intervening and responding to the service command query instead of routing the service command query to the intended circuit block, and wherein the service command query has the destination address associated with the intended circuit block.

14. The method of claim 13, wherein the service command query is a status/error check associated with the intended circuit block or an address check associated with the intended circuit block.

15. The method of claim 13, wherein the intended circuit block is powered off.

16. The method of claim 13, wherein the NPI comprises an NPI root, a plurality of switches, and a plurality of NPI protocol blocks, wherein a switch from the plurality of switches or an NPI protocol block of the plurality of NPI protocol blocks is configured to intervene with the service command query and generate the NPI response to the service command query.

17. The method of claim 13 further comprising calculating aperture values for the plurality of circuit blocks and assign an address to each circuit block of the plurality of circuit blocks.

18. The method of claim 17, wherein the NPI response indicates an error if there is a mismatch between the destination address in the service command query and the assigned address.

19. The method of claim 13, wherein the service command query is routed via the NOC and NPI, and wherein the intervening and responding is via the NPI.

20. The method of claim 13, wherein the NPI response indicates an error if the NPI determines that the destination address is an invalid address, and wherein the NPI response indicates an error if a node connected to a switch of the NPI is not operational, and wherein the NPI response indicates an error if the NPI determines that the intended circuit block is not operational, and wherein the NPI response indicates an error if the intended circuit block has responded with an error.

* * * * *